United States Patent [19]

Weir

[11] Patent Number: 5,473,499

[45] Date of Patent: Dec. 5, 1995

[54] HOT PLUGGABLE MOTHERBOARD BUS CONNECTION METHOD

[75] Inventor: Steven P. Weir, Petaluma, Calif.

[73] Assignee: Harris Corporation, Melbourne, Fla.

[21] Appl. No.: 83,504

[22] Filed: Jun. 30, 1993

[51] Int. Cl.$^6$ .................................................. H02H 9/00
[52] U.S. Cl. ............................ 361/58; 323/908; 395/750
[58] Field of Search ............................... 361/58; 323/908; 395/750

[56] References Cited

U.S. PATENT DOCUMENTS

| | | | |
|---|---|---|---|
| 4,144,565 | 3/1979 | Bouknecht et al. | 364/200 |
| 4,245,270 | 1/1981 | Busby | 361/9 |
| 4,454,552 | 6/1984 | Barnes et al. | 361/9 |
| 4,507,697 | 3/1985 | Ozil et al. | 361/1 |
| 4,675,769 | 6/1987 | Marshall et al. | 361/1 |
| 4,695,914 | 9/1987 | Ohtsuki et al. | 361/42 |
| 4,835,737 | 5/1989 | Herrig et al. | 364/900 |
| 5,077,675 | 12/1991 | Tam | 364/480 |
| 5,203,004 | 4/1993 | Bunton et al. | 395/800 |
| 5,210,855 | 5/1993 | Bartol | 395/500 |

FOREIGN PATENT DOCUMENTS

| | | |
|---|---|---|
| 0402055 | 12/1990 | European Pat. Off. . |
| 0571689 | 12/1993 | European Pat. Off. . |

OTHER PUBLICATIONS

IBM Technical Disclosure Bulletin, vol. 32, No. 9B, Feb. 1990, pp. 424–429, "Hot–Plug Protection Circuit".

Primary Examiner—Todd Deboer
Attorney, Agent, or Firm—Sughrue, Mion, Zinn, Macpeak & Seas

[57] ABSTRACT

A method of connecting an IC card to a motherboard involves first connecting the ground busses, then the power busses and finally the general signal busses. When the power busses are connected, a low current is allowed to flow initially, then, a predetermined period of time is allowed to elapse for equalization of IC card and motherboard voltages, then a full current is allowed to flow. A method of disconnecting an IC card from a motherboard involves first disconnecting the general signal busses, then the power busses and finally the ground busses.

2 Claims, 3 Drawing Sheets

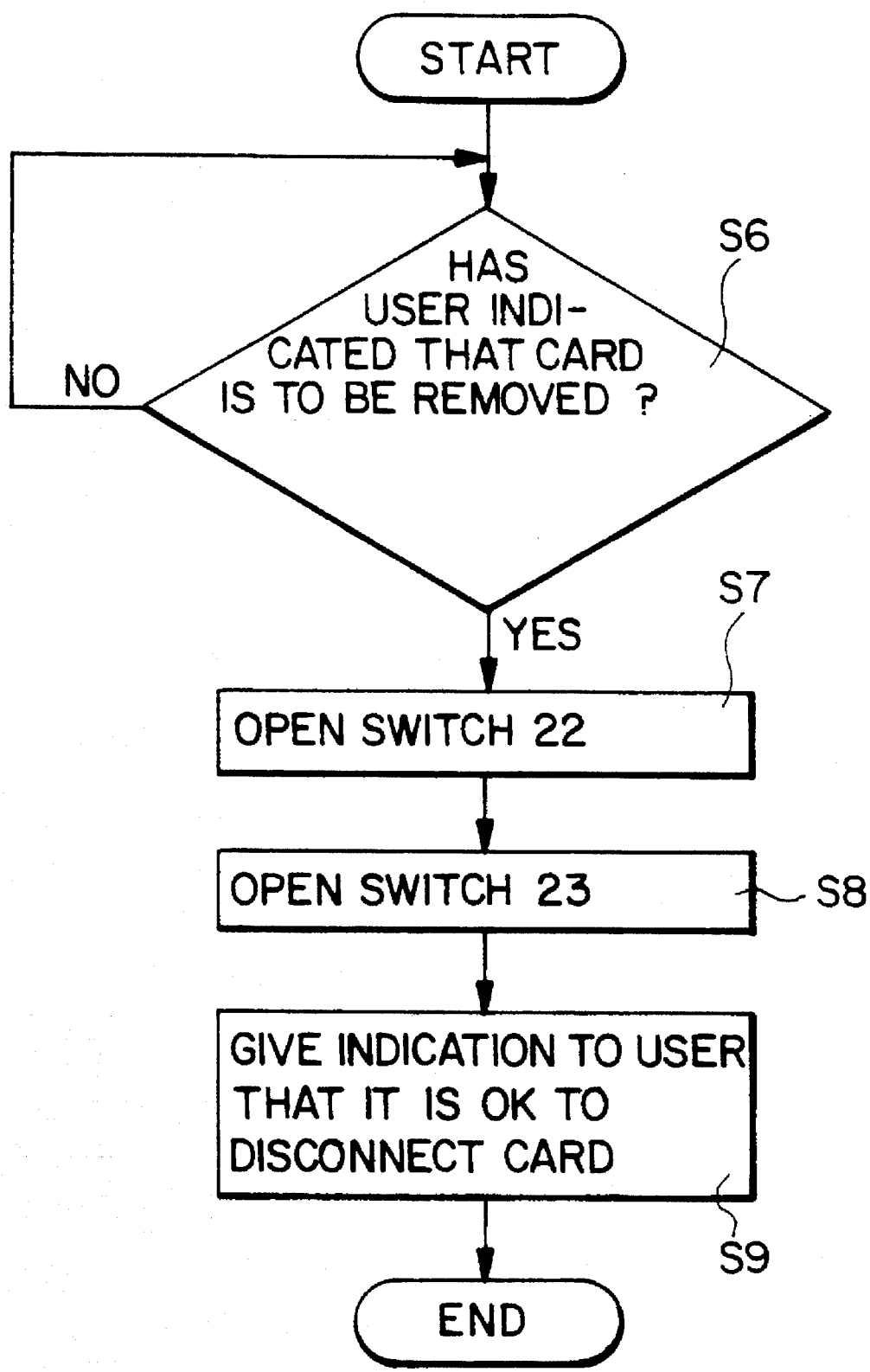

HOT PLUGGABLE MOTHERBOARD BUS CONNECTION METHOD

FIELD OF THE INVENTION

The present invention relates to a connector circuit for connecting an integrated circuit card (IC card) to a motherboard. The connection is made in a hot pluggable manner, meaning that when a card is being connected to the motherboard, there is no need to deactivate the motherboard bus.

BACKGROUND OF THE INVENTION

In the prior art, when a new IC card was being connected to a motherboard bus, the motherboard bus had to be deactivated, thus the bus could not be used by another IC card which had previously been connected. Deactivation was necessary because noise signals could be added to the bus by the new card during insertion, such noise signals negatively impacting the use of the bus by the existing IC cards previously inserted. For example, data being transmitted along the motherboard bus using an existing IC card could be lost during insertion of the new IC card.

Hot pluggable connections between IC cards and a motherboard have been developed in which it is not necessary to deactivate the motherboard bus during insertion of a new card. In these prior art devices, edge connectors are located on the IC cards for connection to the motherboard. When the IC card is connected to a corresponding receptacle on the motherboard, both power connections to the electrical components on the IC card and general purpose signal connections (e.g. for data and addresses) are established during the same connection. To ensure a stable operation of the bus while a card is connected, it is necessary to make sure that power and general purpose signal connections are made in a certain order. For example, it is better to have the power connections made before the general purpose signal connections.

In U.S. Pat. No. 5,210,855 to Bartol, for example, a connection sequence is described in which first ground connections are made, then power connections are made and finally general purpose signal connections are made.

However, a problem has existed in these devices. Specifically, when the power connection is made between the IC card and the motherboard bus, power is applied to the card immediately. This causes a short circuit to exist across the motherboard power bus. This can cause many problems to occur as follows. First, physical damage to the connectors can occur, for example, the connectors can be deplated by the temporary short circuit. Second, disturbances to the signal lines on the motherboard bus can be created by the short circuit on the power bus by electromagnetic interference. Third, regulated voltage levels on the motherboard bus can be caused to fall out of regulation, thus severely effecting all other IC cards connected to the motherboard bus.

Another problem which has existed in the prior art "hot-pluggable" devices mentioned above is that when a card containing active elements is physically removed from the motherboard, the active levels existing on the connectors can cause disruptions to occur to the motherboard bus.

SUMMARY OF THE INVENTION

It is an object of the invention to solve the above-noted problems which have existed in the prior art.

It is a more specific object of the invention to provide for a controlled application of power to an IC card from the motherboard bus. Current flow is limited to a safe value until voltage levels between the motherboard bus and the IC card have equalized.

A further object of the invention is to provide for controlled disconnection of the various connections between the IC card and the motherboard when the IC card is to be physically removed from the motherboard. Once the connectors have been fully disconnected, only then is the IC card physically removed from the motherboard bus, thus preventing disruptions to the bus from occurring.

The above objects have been attained as follows.

A connector is provided on a motherboard for connecting the ground, power and general purpose signal connections of an IC card to the corresponding motherboard busses. During connection of an IC card to the motherboard, the connections are made in the following order. First, the ground connections are made, then the power connections are made, and finally the general purpose data connections are made.

When the power connections are made, the current flow is limited by, for example, a variable resistance circuit, under programmed control, so that a safe amount of current flows through the power connections between the IC card and the motherboard power bus. Then, after a predetermined period of time has elapsed during which the voltage levels between the motherboard bus and the IC card have equalized, the current is allowed to reach its maximum steady state value under programmed control.

When the IC card is to be removed from the motherboard, the connections between the IC card and the motherboard bus are disengaged in the reverse order from which they were engaged during the time when the IC card was being connected to the motherboard. That is, under programmed control, first the general purpose signal connectors are disengaged, then the power is disengaged and finally the ground connections are disengaged.

BRIEF DESCRIPTION OF THE DRAWINGS

The invention will now be clearly explained with reference to the below drawings.

FIG. 3 shows a flow chart of a disconnection routine of the present invention for disconnecting an IC card from a motherboard.

DETAILED DESCRIPTION OF THE PREFERRED EMBODIMENTS

Figure 1:
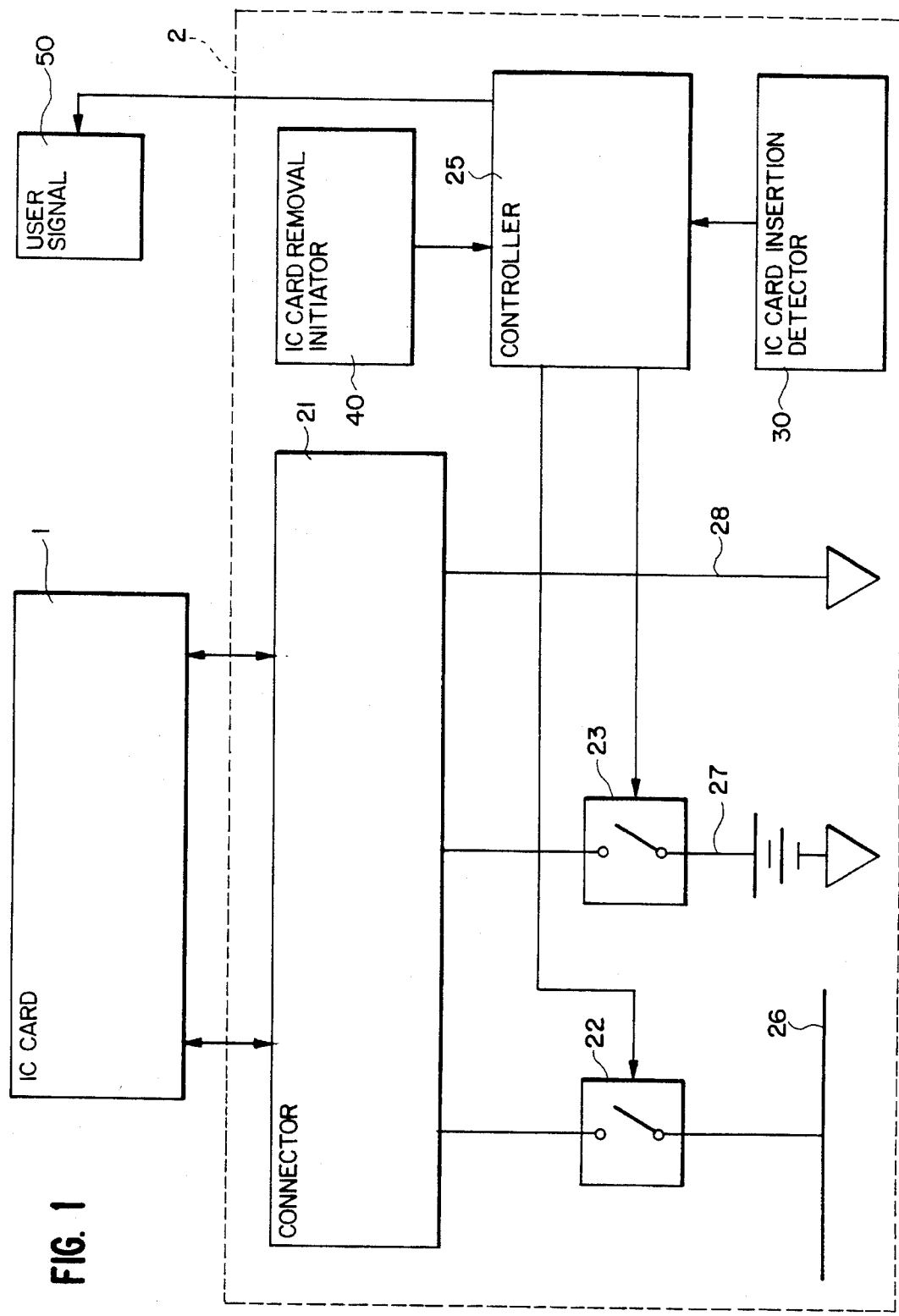
FIG. 1 shows a basic circuit structure of the present invention.
Figure 2:
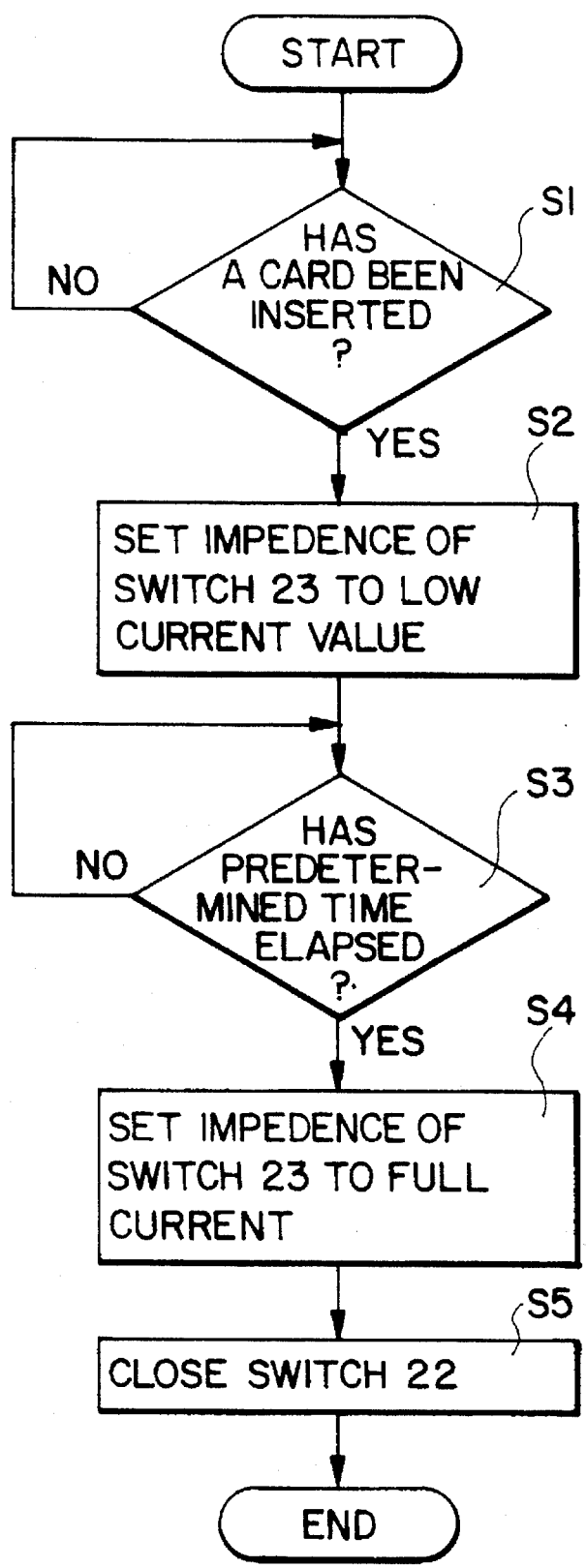
FIG. 2 shows a flow chart of a connection routine of the present invention for connecting an IC card to a motherboard.

FIG. 1 shows a basic circuit structure of the present invention. An IC card 1 connects to a motherboard 2 via a connector circuit 21 located on the motherboard 2. The ground bus of the IC card 1 is connected to the ground bus 28 of the motherboard 2 during insertion of the card into connector 21. A controller 25 controls switches 22 and 23 located between connector 21 and general purpose signal bus 26 and power bus 27, respectively, so that the switches are closed as follows. When IC card insertion detector 30 detects that an IC card 1 has been physically inserted into a connector 21 by, for example, monitoring power supply current, (see FIG. 2 step S1), the controller 25 closes the switch 23 (steps S2 to S4 as will be fully described below) to connect the motherboard power bus 27 to the IC card 1.

Finally, the controller 25 closes the switch 22 (step S5) to connect the motherboard general signal bus 26 to the IC card 1.

The switch 23 is of a type in which the impedance can be set to a certain value for a predetermined time duration under control of the controller 25. The controller 25 controls the impedance of the switch 23 so that current flow is at first limited to a safe and low value (step S2). Then, after a predetermined time has elapsed (step S3), the predetermined time being dependent on the time it takes for the voltage levels between the motherboard 2 and the IC card 1 to become equalized, the controller 25 lessens the impedance of the switch 23 so that the maximum steady current for proper operation of the IC card 1 will flow to the card 1 (step S4).

Thus, physical damage to the connectors, caused by arcing on the connectors during the initial in-rush of current to the card, can be prevented by using the controlled current switch as described above. Further, disturbances to signal lines 26 on the motherboard by electromagnetic interference can also be prevented. Still further, the deregulation of regulated voltage levels on the motherboard 2 can be prevented.

The controller 25 also controls the switches 22 and 23 in the following manner when IC Card removal initiator 40 detects that the user wishes to physically remove an IC card 1 from the motherboard 2 (see step S6 of FIG. 3). The switches are caused to open in a certain order, specifically, the reverse order to the order in which they were closed when the IC card was first connected to the motherboard connector 21. More specifically, first the general signal bus switch 22 is opened (step S7), and then the power bus switch 23 is opened (step S8). Then, an indication is given to the user that it is alright to physically disconnect the card 1 from the motherboard connector 21 (step S9) by way of user signal 50. The ground connection is disconnected when the card is physically removed by the user.

It is important that the switches be opened before the IC card 1 is physically removed from the connector 21. Specifically, if these switches are opened first then mechanical contact bounce on the signal lines can be prevented.

There are two ways to carry out this controlled disconnection of the connection lines. First, a software control technique can be used in which a register is provided inside the controller 25. A predetermined value is written to the register when the user wishes to physically remove the IC card 1. Under software control, the contents of the register are constantly checked to determine whether the contents are equal to the predetermined value. When it is determined that the contents of the register are equal to the predetermined value, the switches 22 and 23 are opened. After the switches are opened, an indication is given to the user by means of user signal 50 which may be, for example, a CRT or by indicator lights, that it is permissible to physically remove the IC card 1 from the motherboard connector 21.

The second way is a mechanical technique in which a sensing element, such as an optical sensor or a pressure sensor, senses that an access cover (which covers the IC card 1) has been removed. When the access cover has been removed, it is clear that the user may be in the process of removing the IC card 1 from the motherboard connector 21. Thus, when the sensing element senses that the access cover has been removed the switches are opened as discussed above.

The spirit and scope of the invention is not to be limited by the above-described embodiments, but only by the appended claims.

I claim:

1. A method of connecting an IC card to a motherboard, comprising steps of:

(a) providing said IC card with connecting pins of equal lengths;

(b) detecting that said IC card has been inserted into a connector located on said motherboard;

(c) electrically connecting a power bus of said motherboard to a power bus of said IC card only after it has been detected that the IC card has been inserted into said connector; and (d) connecting a general signal bus of said motherboard to a general signal bus of said IC card only after said power bus of the motherboard has been connected to the power bus of the IC card;

wherein, said step (c) includes substeps in the sequence as follows:

(c1) allowing only a low current to flow between said power bus of said motherboard and said power bus of said IC card;

(c2) waiting for a predetermined period of time, said predetermined period of time corresponding to the time it takes for voltage levels between said motherboard and said IC card to become equalized; and (c3) allowing a full current to flow between said power bus of said motherboard and said power bus of said IC card.

2. An apparatus for facilitating disconnection of an IC card, having connecting pins of equal length, from a motherboard, comprising:

(a) means for determining that a user wishes to remove an IC card from said motherboard;

(b) means for electrically disconnecting a general signal bus of said motherboard from a general signal bus of said IC card only after it has been determined that a user wishes to remove an IC board;

(c) means for electrically disconnecting a power bus of said motherboard from a power bus of said IC card after the general bus of the motherboard has been disconnected from the general bus of said IC card;

(d) means for indicating to said user, after the power bus of said motherboard has been electrically disconnected from the power bus of the IC card, that it is alright to physically disconnect the card from the motherboard.

* * * * *